(12) United States Patent
Miller

(10) Patent No.: US 7,340,898 B2
(45) Date of Patent: Mar. 11, 2008

(54) SOLAR-THERMAL POWERED GENERATOR

(76) Inventor: Larry D. Miller, 4030 Oak Tree Cir., Rochester, MI (US) 48306

( * ) Notice: Subject to any disclaimer, the term of this patent is extended or adjusted under 35 U.S.C. 154(b) by 378 days.

(21) Appl. No.: 10/760,858

(22) Filed: Jan. 20, 2004

(65) Prior Publication Data

US 2004/0148933 A1    Aug. 5, 2004

Related U.S. Application Data

(60) Provisional application No. 60/443,684, filed on Jan. 30, 2003.

(51) Int. Cl.
*B60K 16/00* (2006.01)
*F03G 6/00* (2006.01)

(52) U.S. Cl. ............... 60/641.8; 60/641.13; 60/641.15

(58) Field of Classification Search ............. 60/641.8, 60/641.13, 641.14, 641.15
See application file for complete search history.

(56) References Cited

U.S. PATENT DOCUMENTS

| | | | |
|---|---|---|---|
| 3,137,125 A | 6/1964 | Kyryluk ........................ 60/26 |
| 3,740,565 A | 6/1973 | Wesley ........................ 290/55 |
| 3,936,652 A | 2/1976 | Levine ........................ 290/2 |
| 3,945,106 A | 3/1976 | Mayr et al. .................... 29/429 |
| 3,979,597 A | 9/1976 | Drucker ...................... 290/55 |
| 4,010,580 A | 3/1977 | Mayr et al. .................... 52/80 |
| 4,016,725 A | 4/1977 | Fiss ............................. 60/690 |
| 4,018,051 A | 4/1977 | Gay ............................. 60/398 |
| 4,118,636 A | 10/1978 | Christian ...................... 290/52 |
| 4,148,850 A | 4/1979 | Schulte et al. ............... 261/109 |
| 4,211,084 A | 7/1980 | Wallace ....................... 60/641 |
| 4,275,309 A | 6/1981 | Lucier ........................ 290/1 R |
| 4,296,733 A * | 10/1981 | Saunders .................... 126/619 |
| 4,326,363 A | 4/1982 | Leonhardt et al. ............. 52/80 |
| 4,331,042 A | 5/1982 | Anderson .................... 74/572 |
| 4,388,384 A * | 6/1983 | Rauh et al. .................. 429/111 |
| 4,433,544 A | 2/1984 | Wells et al. .............. 60/641.12 |
| 4,452,046 A | 6/1984 | Valentin .................. 60/641.11 |
| 4,899,728 A * | 2/1990 | Peter et al. .................. 126/622 |
| 5,300,817 A | 4/1994 | Baird ........................... 290/55 |
| 6,201,313 B1 * | 3/2001 | Nakamats .................... 290/54 |
| 6,881,144 B2 * | 4/2005 | Hansen et al. ............... 454/365 |
| 6,959,520 B2 * | 11/2005 | Hartman ..................... 52/729.2 |

* cited by examiner

*Primary Examiner*—Hoang Nguyen
(74) *Attorney, Agent, or Firm*—Gifford Krass Sprinkle, Anderson & Citkowski

(57) ABSTRACT

A solar-thermal powered generator has an absorber assembly which includes a gas permeable body of light absorbing material operative to absorb incident light and convert the absorbed light into heat. The gas permeable body of light absorbing material is supported in a spaced-apart relationship with a subjacent surface to define a volume which is bounded by the body of light absorbing material and the subjacent surface. A gas flow channel establishes fluid communication between the volume and the ambient atmosphere, and a turbine is disposed so as to intercept the gas flowing between the ambient atmosphere and the interior volume and extract kinetic energy therefrom. Also disclosed is a method for power generation using the disclosed generators.

7 Claims, 8 Drawing Sheets

US 7,340,898 B2

SOLAR-THERMAL POWERED GENERATOR

RELATED APPLICATION

This application claims priority of U.S. Provisional Patent Application Ser. No. 60/443,684 filed Jan. 30, 2003, and entitled "Solar-Thermal Powered Generator."

FIELD OF THE INVENTION

This invention relates generally to power generation systems. More specifically, the invention relates to solar energized power generating systems. Most particularly, the invention relates to systems which employ solar heating to generate power.

BACKGROUND OF THE INVENTION

Solar power has long been considered an attractive source of power since it is renewable and nonpolluting. In this regard, a number of systems have been developed to extract power from solar energy. Photovoltaic devices directly convert absorbed light into electrical energy. These devices are generally quite expensive, which restricts their use to specialized applications and precludes employing them in large-scale power generation systems. Furthermore, photovoltaic devices can only access a small portion of the available solar spectrum. Solar-thermal devices utilize the heating effect of solar radiation to produce power. Such devices are quite attractive since they can access virtually all of the solar spectrum. In solar-thermal devices, absorbed light is converted to heat, and the heat energy is employed directly, as for example to heat water, or it is employed to power engines, generators and the like.

In one group of solar-thermal generators, the heating effect of solar radiation is utilized to warm a gas, typically air, so as to cause that gas to rise. Devices of this type are shown in U.S. Pat. Nos. 4,275,304; 3,936,652; 4,016,725 and 5,300,817. Energy can be tapped from the system by disposing a turbine in the stream of rising air. One embodiment of this type of generator which has been proposed is referred to as a "solar chimney." In devices of this type, a relatively large volume of air or other such working gas is trapped beneath an optically transparent surface where it is warmed by the absorption of solar radiation. The heated gas is allowed to rise through a relatively large chimney, and a turbine generator assembly disposed in the chimney is turned by the stream of rising gas. Generators of this type will be very difficult to build and maintain, since they require covering a very large area with glazing panels, and since chimney assemblies are expected to be one kilometer high. Such devices will be difficult to maintain, and can constitute an eyesore.

The present invention, as will be described in detail hereinbelow, constitutes a solar-thermal powered generator which does not require the use of any chimney assembly, nor does it require covering large areas with glazing panels. The generator assembly of the present invention may be built at a relatively low cost utilizing low-cost materials and relatively simple building techniques.

BRIEF DESCRIPTION OF THE INVENTION

Disclosed herein is a solar-thermal powered generator. The generator includes an absorber assembly having a gas permeable body of light absorbing material operative to absorb incident light and convert the absorbed light into heat. The gas permeable body is supported in a spaced-apart relationship with a subjacent surface so as to define a volume which is bounded by the body of light absorbing material and the subjacent surface. The generator includes a gas flow channel which establishes fluid communication between the volume and an ambient atmosphere so that a gas stream can flow therebetween. A turbine is disposed so as to intercept the gas stream and extract kinetic energy therefrom. In the operation of the device, the body of light absorbing material absorbs light and converts the light to heat. The heat warms the ambient atmosphere proximate the light absorbing body so as to decrease the pressure thereof and cause the atmosphere to rise. The rising atmosphere causes gas to flow through the gas flow channel into the volume and through the gas permeable body of light absorbing material. In some embodiments, the body of light absorbing material is maintained in a spaced-apart relationship with the subjacent surface by a sidewall, while in other embodiments, the light absorbing body rests upon the earth, and the subjacent surface is excavated to define the volume.

In some embodiments, the body of light absorbing material is a bed of mineral material such as lava rock. In other embodiments, the body of light absorbing material is a louvered body. In particular embodiments, the louvered body itself is movable and functions as a turbine. In other embodiments, the turbine is disposed in, or forms the entirety of, a sidewall which supports the absorber assembly. Also disclosed is a method for generating power through the use of the solar-thermal powered generator of the present invention.

DETAILED DESCRIPTION OF THE INVENTION

The solar-thermal powered generator of the present invention is operative to absorb incident solar illumination, convert that illumination into heat energy which is employed to create a rising stream of air or other such working gas, and to extract kinetic energy from the rising stream by means of a turbine or the like. This extracted energy may be used directly in the form of mechanical energy to power pumps or other such machinery, or it may be employed to power an electrical generator. The power generator of the present invention may be implemented in various embodiments, and will be explained with reference to particular of these embodiments, it being understood that yet other embodiments may be implemented.

Figure 1:
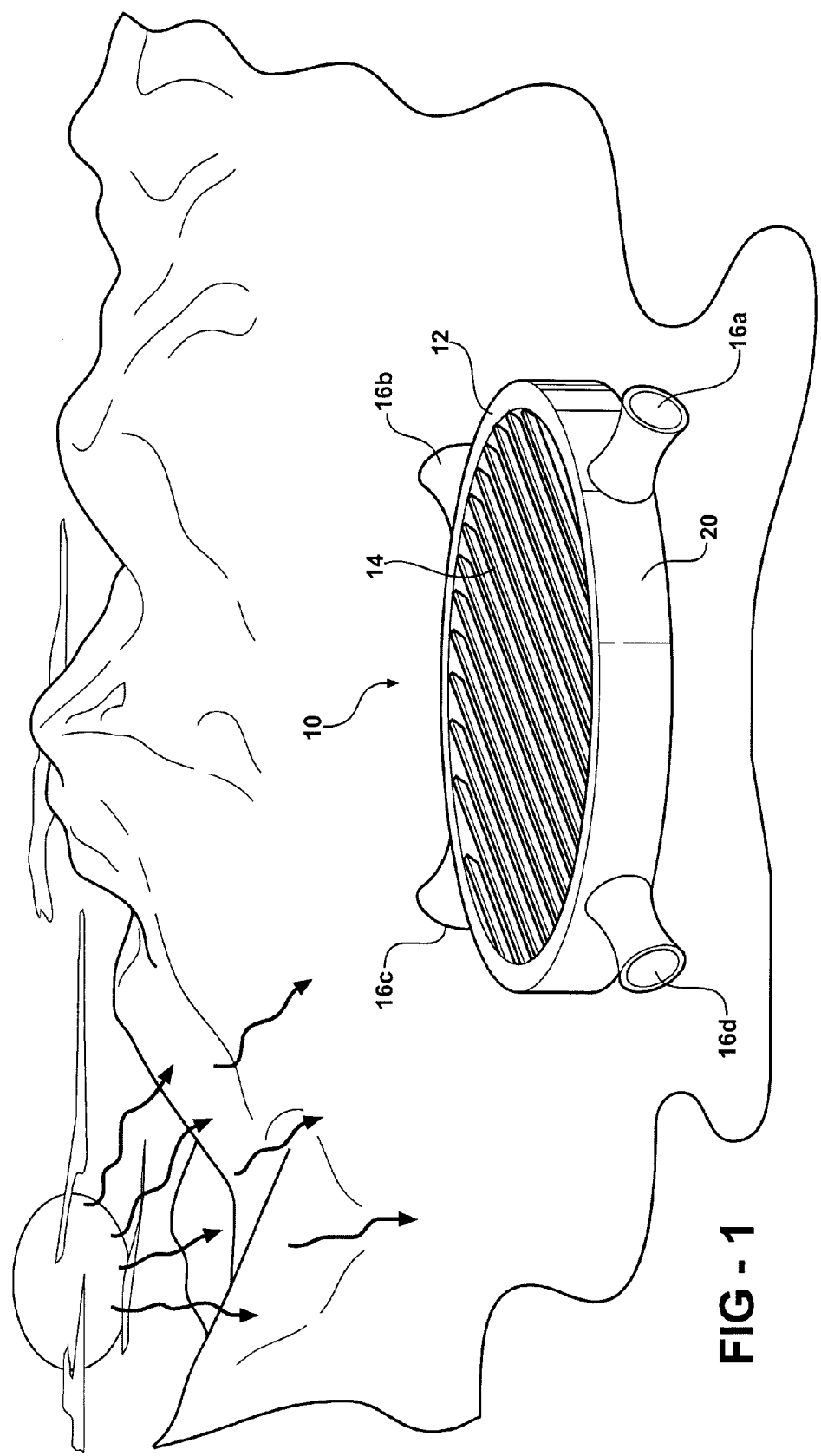
FIG. 1 is a perspective, environmental view of one embodiment of generator of the present invention.

Referring now to FIG. 1, there is shown a perspective view of one embodiment of solar-thermal power generator 10 structured in accord with the principles of the present invention. The device 10 of FIG. 1 includes an absorber assembly 12 which includes a gas permeable body of light absorbing material 14 which is supported in a spaced-apart relationship with a subjacent surface, which in this instance is the earth. The absorber assembly 12, and subjacent earth, at least partially, bound and enclose an interior volume. In this embodiment, the absorber is spaced from the subjacent ground by a sidewall 20. A series of gas flow channels 16a-d, formed through the sidewall 20, establishes fluid communication between the interior volume and the ambient atmosphere so as to permit a flow of atmospheric gases therebetween. As will be explained below, a turbine blade is disposed in the channel so as to intercept the gas stream and extract mechanical energy therefrom.

Figure 2:
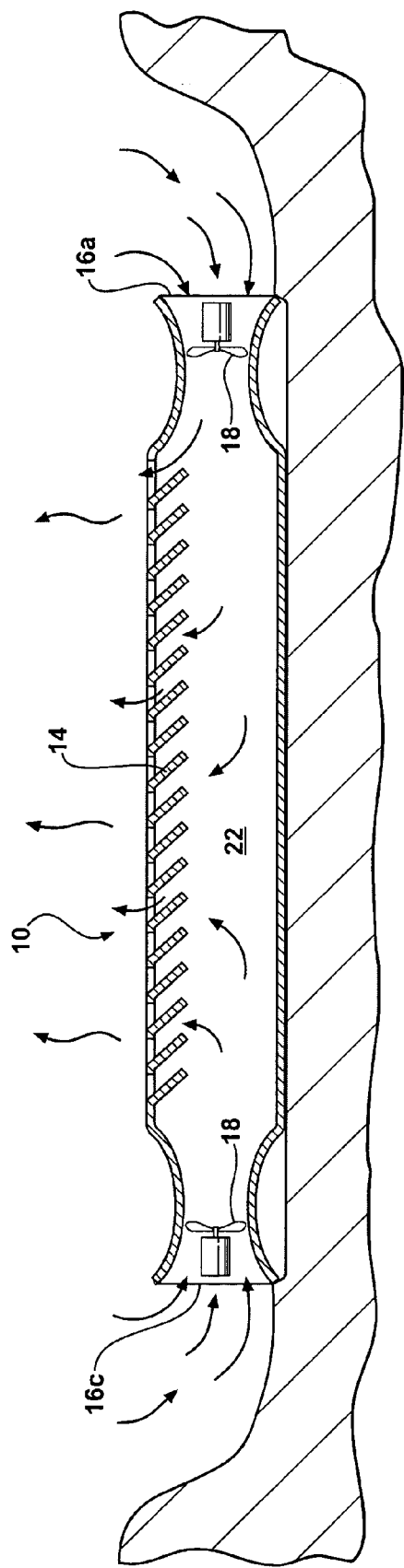
FIG. 2 is a cross-sectional view of the generator of FIG. 1.

Referring now to FIG. 2, there is shown a cross-sectional view of a generator generally similar to that of FIG. 1, and as is illustrated therein, the generator can be recessed below ground level so as to be less obtrusive. The generator of FIG. 2 includes a plurality of louvers which constitute the light absorbing body 14. In operation, the louvers absorb incident solar illumination and convert that illumination to heat, thereby becoming warm. The warm louvers transfer their heat to air which comes in contact with them, thereby warming the air and causing it to expand. The warmed low-pressure air rises causing cooler air to be drawn into the interior volume 22 through the channels 16a, 16c thereby turning the turbines 18. The fact that the absorbing body 14 is gas permeable enhances the efficiency of the device by maximizing heat transfer, and also eliminates the need for chimneys and other such expensive and obtrusive structures.

Figure 3:
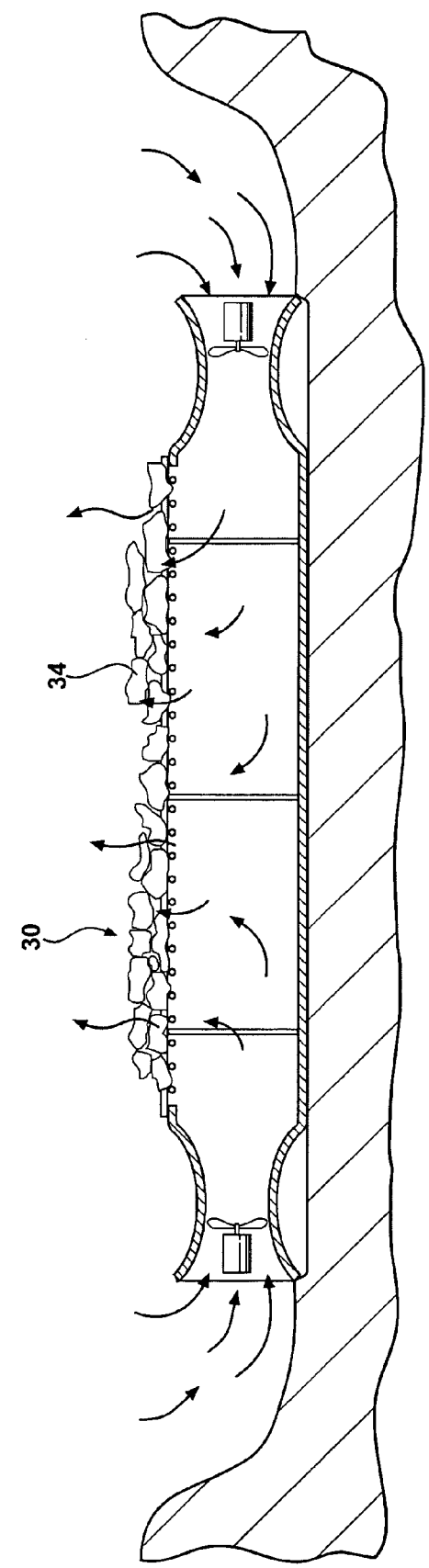
FIG. 3 is a cross-sectional view of another embodiment of generator generally similar to that of FIGS. 1 and 2.

Referring now to FIG. 3, there is shown another embodiment of generator structured in accord with the principles of the present invention. The generator 30 of FIG. 3 is generally similar to the generator 10 of FIGS. 1 and 2; however, in this embodiment, the light absorbing body comprises a volume of mineral material 34. The mineral material functions to absorb solar energy and generate heat which is transferred to the working atmosphere. The mineral material 34 is preferably loosely packed to permit ready airflow therethrough. One particularly preferred mineral comprises lava stone. The stone is light in weight, porous and dark in color. It is anticipated that yet other mineral materials may be similarly employed.

Figure 4:
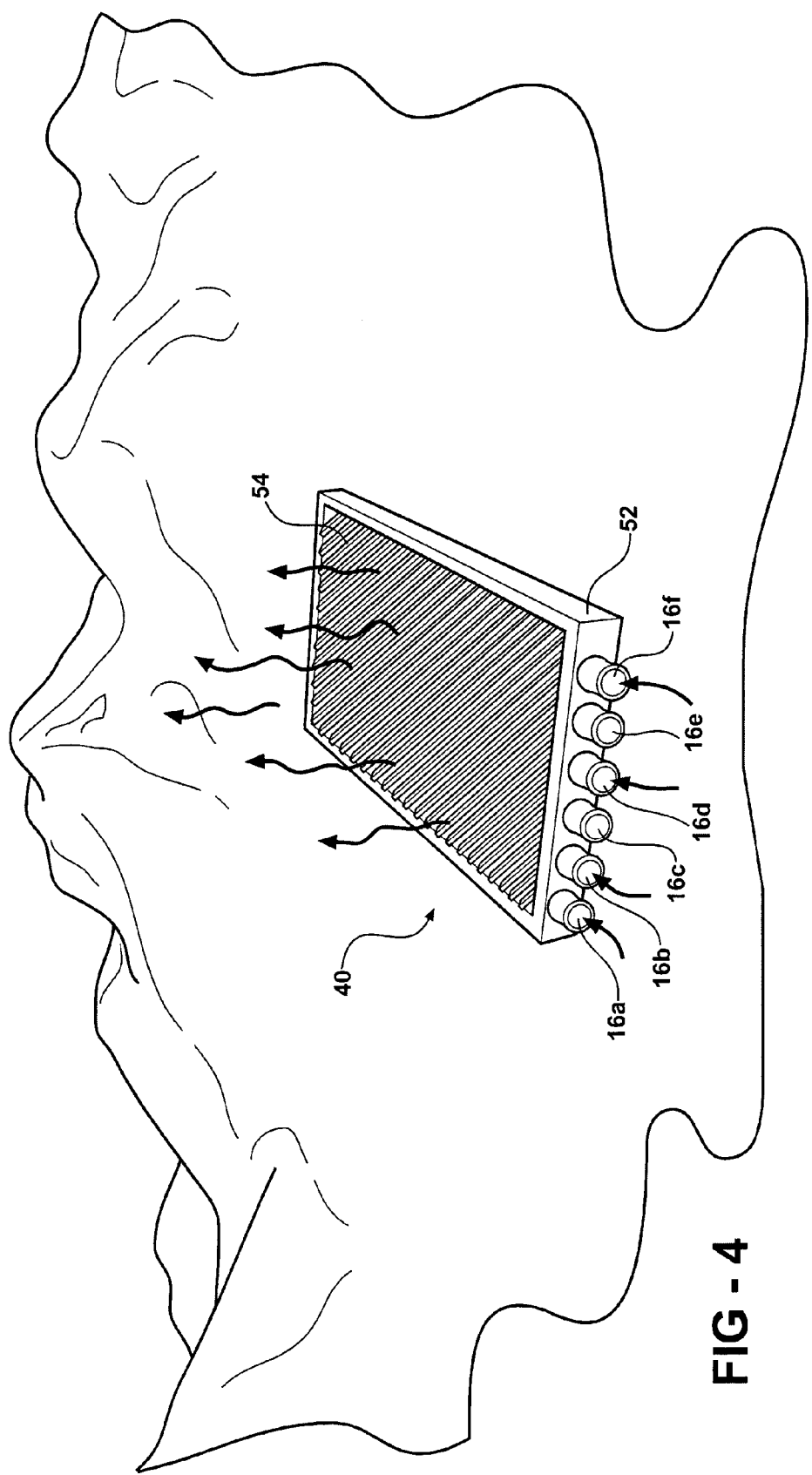
FIG. 4 is a perspective, environmental view of another embodiment of generator of the present invention.

Yet other embodiments may be implemented, and FIG. 4 depicts a generally square shaped generator 40. In this embodiment, all of the air inlets 16a-16f are on one side thereof. Furthermore, the sidewall 52 of the generator is of a generally tapering shape. As in the previous embodiment, a gas permeable light absorbing material 54 forms the upper surface of the generator. Embodiments of the general type shown in FIG. 4 may be configured to exploit geographic or other environmental conditions which can accentuate the efficiency of the device. For example, the FIG. 4 embodiment may be disposed on the slope of a hillside so as to be exposed to maximum levels of solar radiation. Furthermore, the air inlets can be placed so that prevailing winds contribute to the flow of gas therethrough. In yet other embodiments, the generator may be still differently configured to accommodate geographic or other environmental conditions.

Figure 5:
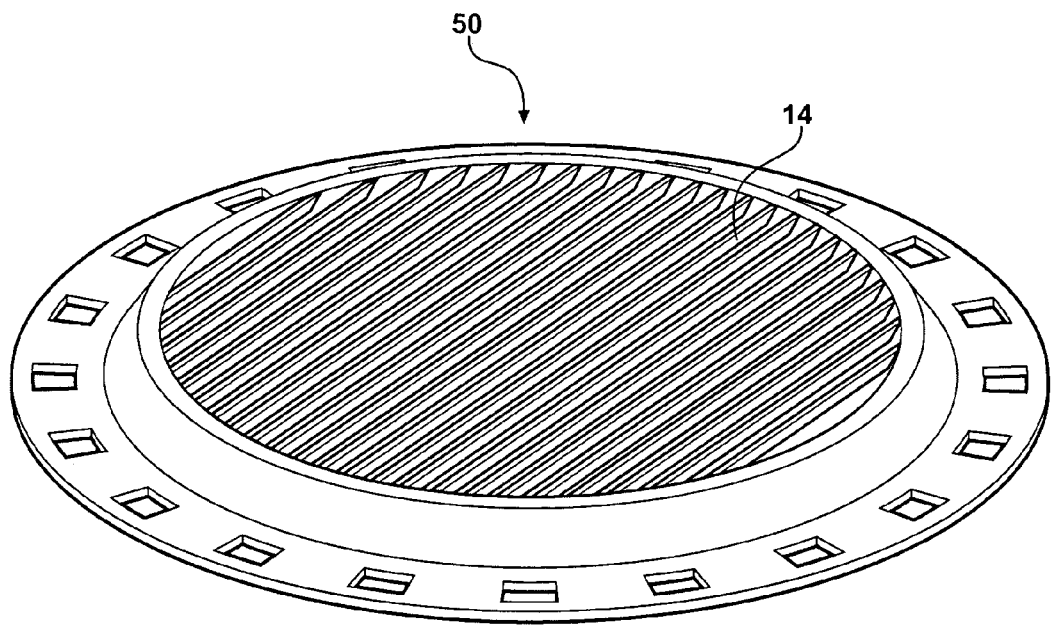
FIG. 5 is a perspective view of yet another embodiment of generator of the present invention.
Figure 6:
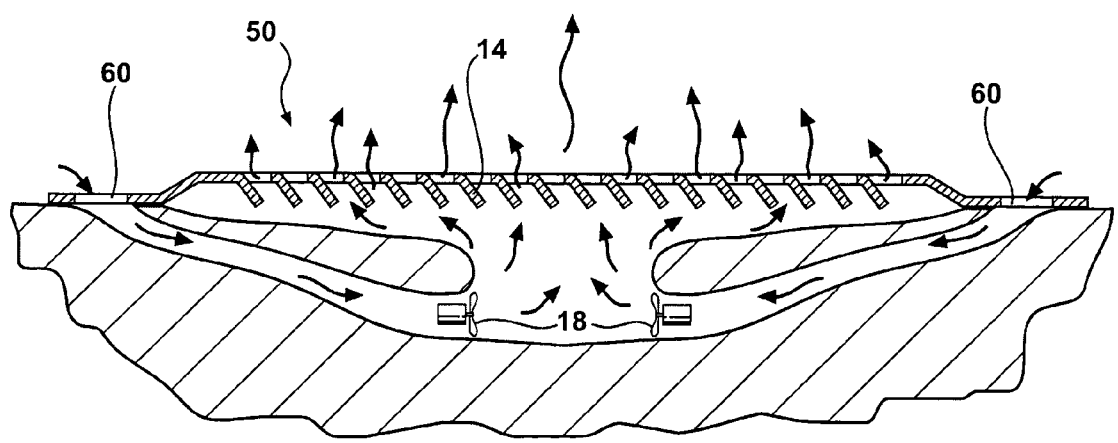
FIG. 6 is a cross-sectional view of the generator of FIG. 5 showing its relationship to the subjacent earth.

FIGS. 5 and 6 depict yet another embodiment of generator structured in accord with the principles of the present invention. As is shown in FIG. 5, which constitutes a perspective view, the generator 50 includes a light absorbing body 14, which may constitute louvers, minerals or any other such material. In this embodiment, and as is best shown in FIG. 6, which is a cross-sectional view of the generator, air enters through openings 60 formed in the perimeter of the generator device and flows through an excavation into the surface of the earth therebelow. The turbines 18 are preferably located at a point of high velocity airflow.

Figure 7A:
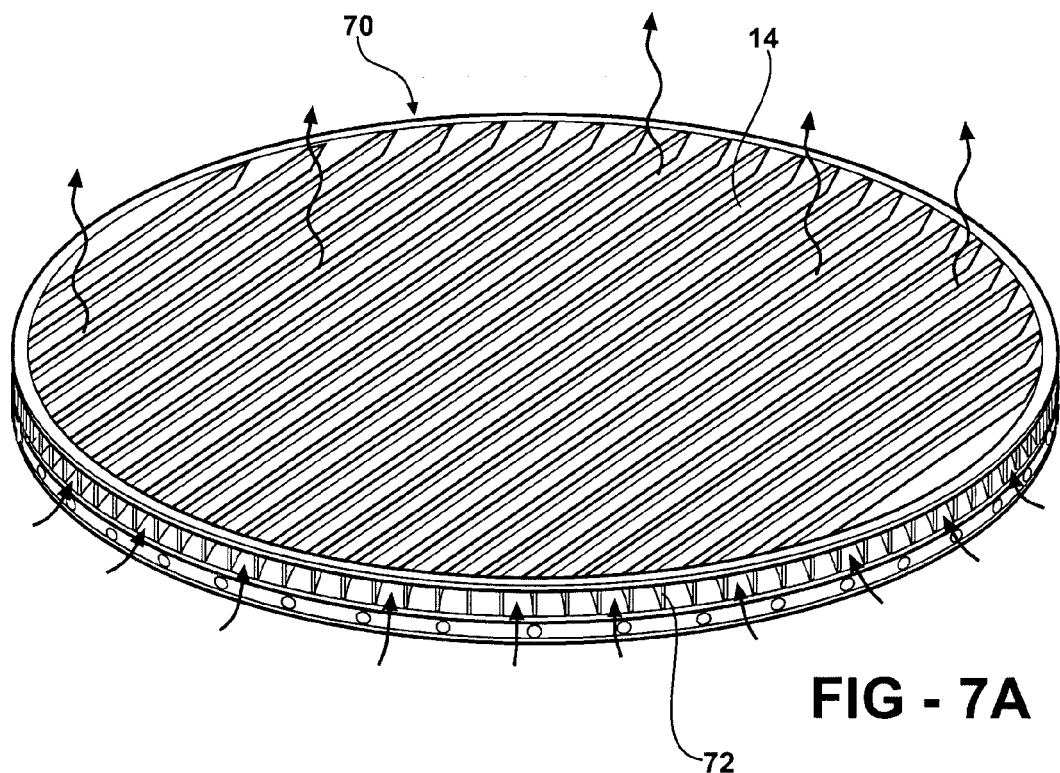
FIG. 7A is a perspective view of another embodiment of generator of the present invention which includes the peripherally disposed turbine assembly.
Figure 7B:
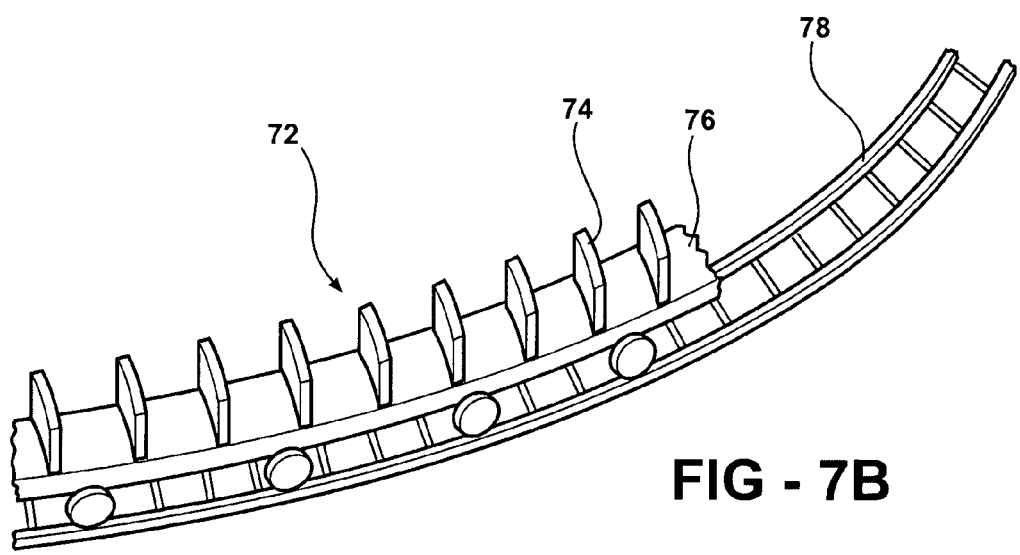
FIG. 7B is an enlarged, fragmentary view of the peripheral turbine assembly of FIG. 7A.

FIGS. 7A and 7B depict yet another embodiment of generator 70. As is shown in FIG. 7A, which is a perspective view of the generator 70, a body of light absorbing gas permeable material 14 is disposed as in the previous embodiments, in a spaced-apart relationship with a subjacent surface. In this instance, no sidewall is present, and the entire perimeter of the device provides the airflow channel. A turbine assembly 72 is configured to extend around the entire perimeter of the generator 70. In this particular embodiment, and as is best shown by FIG. 7B, the turbine 72 is constituted by a series of air foils 74 or sails which are mounted upon one or more wheeled carts 76 which are in turn supported by a track 78. The track and turbine assembly encircles the perimeter of the generator, and the inward flow of air causes the entire turbine assembly to move along the track, about the perimeter. One or more electrical generators may be associated with the rotating carts. Alternatively, power may be inductively extracted from the moving carts by means of magnets, coils and the like. Also, it is to be understood that magnetic levitation systems, air cushions and the like may be employed to decrease friction in this embodiment.

Figure 8A:
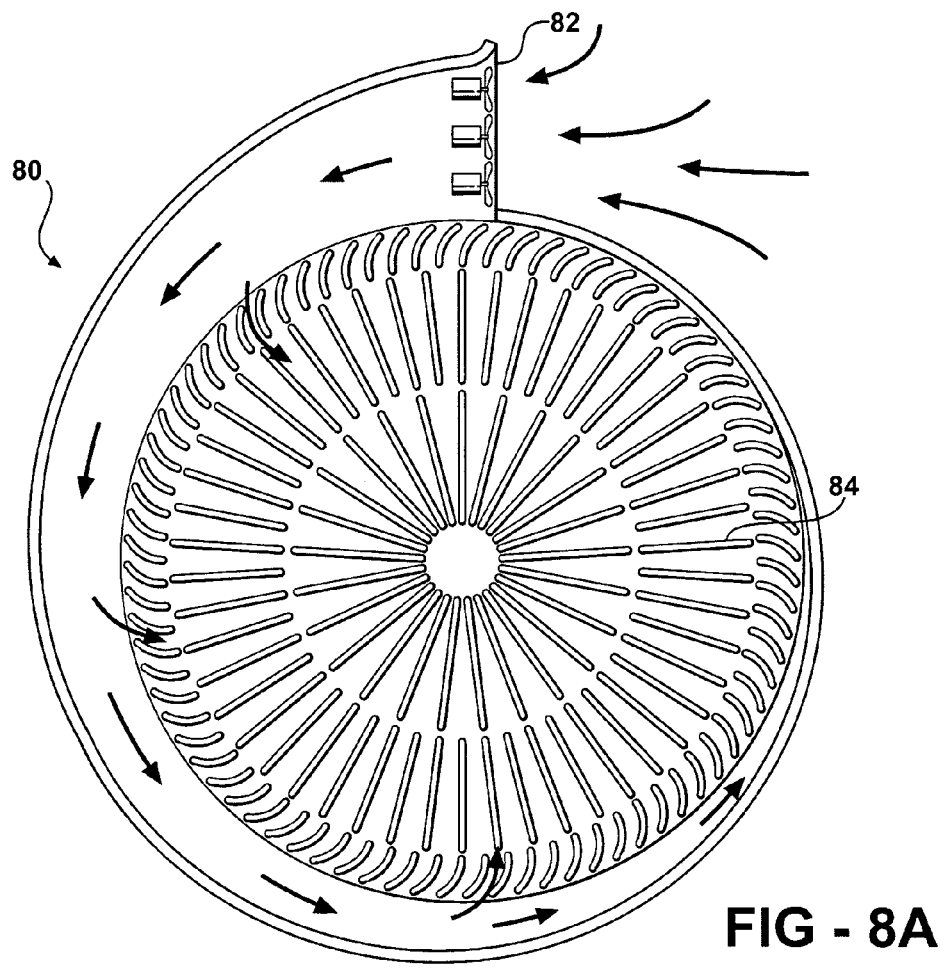
FIG. 8A is a top view of another embodiment of generator of the present invention.
Figure 8B:
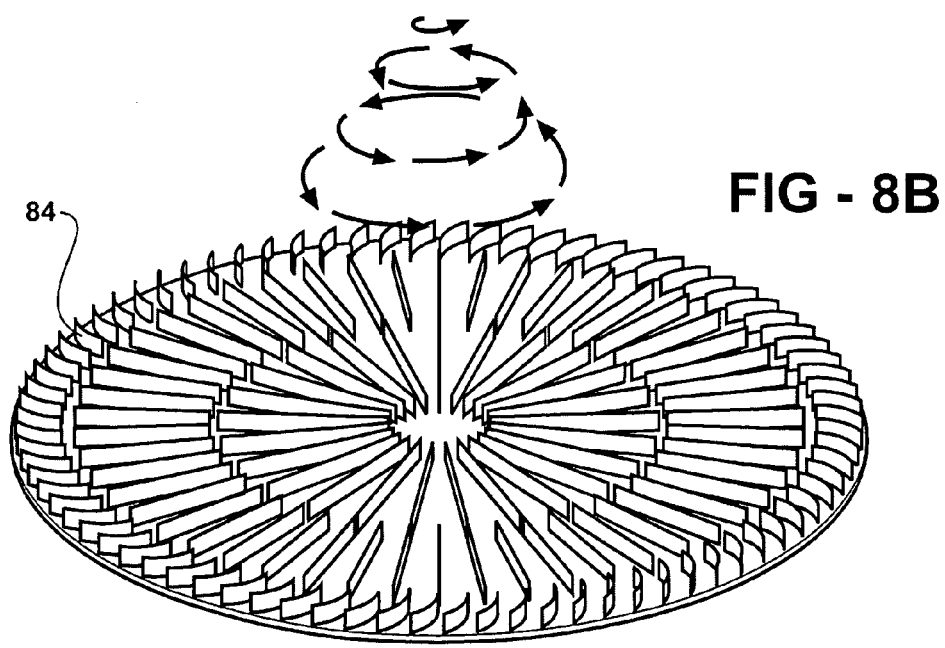
FIG. 8B is a perspective view of the absorber assembly of the generator of FIG. 8A.

In the northern hemisphere rising, low-pressure air tends to rotate in a counter-clockwise direction when viewed from above, as a result of the Earth's rotation. The generators of the present invention may be configured so as to impart a counter-clockwise rotational force on the stream of rising air thereby further enhancing the efficiency of the generator. Referring now to FIGS. 8A and 8B, there is shown one embodiment 80 of the present invention so configured. In this embodiment, the side air inlet 82 is disposed so as to direct incoming air into a counter-clockwise swirl. Likewise, the light absorbing upper surface 84 is configured as a series of directional louvers which further accentuate the swirl of the rising air, as will be seen with reference to FIG. 8B. As will be apparent to those of skill in the art, yet other configurations of the invention may be employed to direct the airflow in a counter-clockwise direction. Embodiments for use in the southern hemisphere can be oppositely configured.

Figure 9:
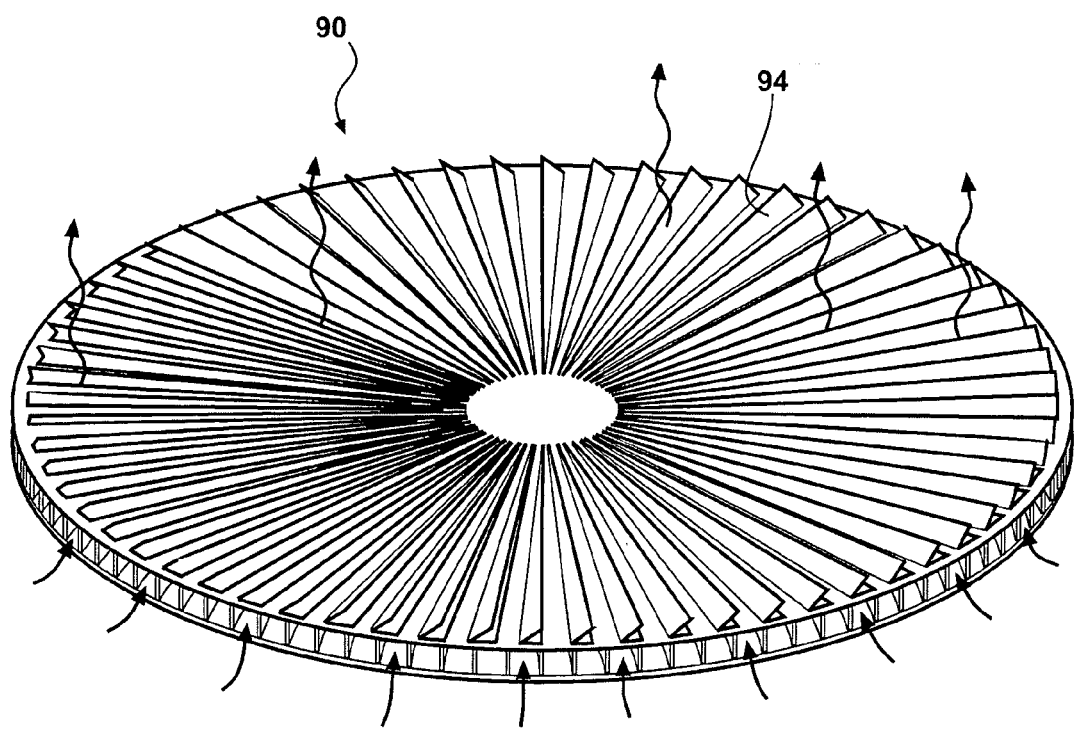
FIG. 9 is a perspective view of another embodiment of generator having a movable absorber.
Figure 10:
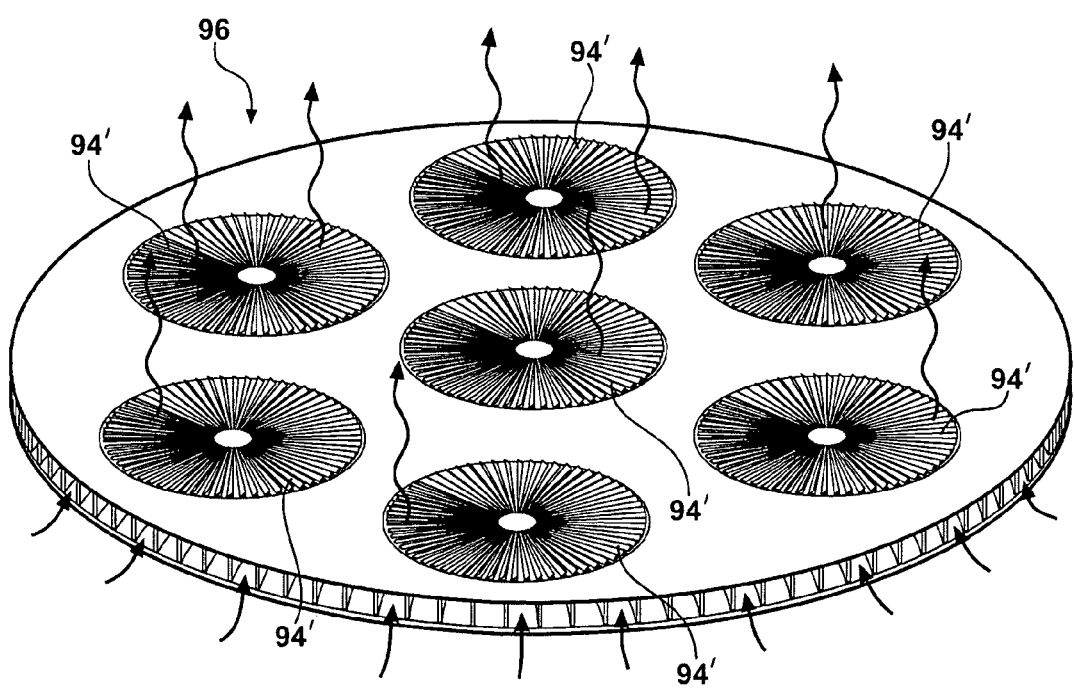
FIG. 10 is a perspective view of a generator having a plurality of movable absorbers.

In some embodiments of the present invention, the turbine and light absorbing body may be integral, and such embodiments are shown in FIGS. 9 and 10. Referring now to FIG. 9, there is shown a perspective view of a generator 90 so configured. In this embodiment, a series of turbine blades 94 comprise a light absorbing body of the generator. The blades are configured as light absorbing louvers, and as previously described, these blades will heat an ambient atmosphere causing it to rise thereby drawing cooler air through the generator. The rising air will turn the turbine blades generating power. This embodiment may be employed in connection with the air-directing louvers of the FIG. 8 embodiment or with other configurations hereof.

Referring now to FIG. 10, there is shown another variant 96 of the generator of FIG. 9. In the FIG. 10 embodiment, the generator 96 has a light absorbing body comprised of a number of discrete turbines 94' of the type previously described.

In the embodiments heretofore described, airflow is shown as proceeding through a flow channel which passes either under the light absorbing body or through a sidewall of the generator assembly. The present invention is not so limited, and other embodiments of the invention may include an absorber which also functions as an airflow channel. In such embodiments, airflow passes downward through a perimeter region of the light absorbing body where it is preheated and then upward through the center portion of the body. As in the previous embodiments, the body may comprise louvers, minerals or the like. Also, while not depicted, it is to be understood that turbines may be appropriately positioned to intercept the air stream.

Figure 11:
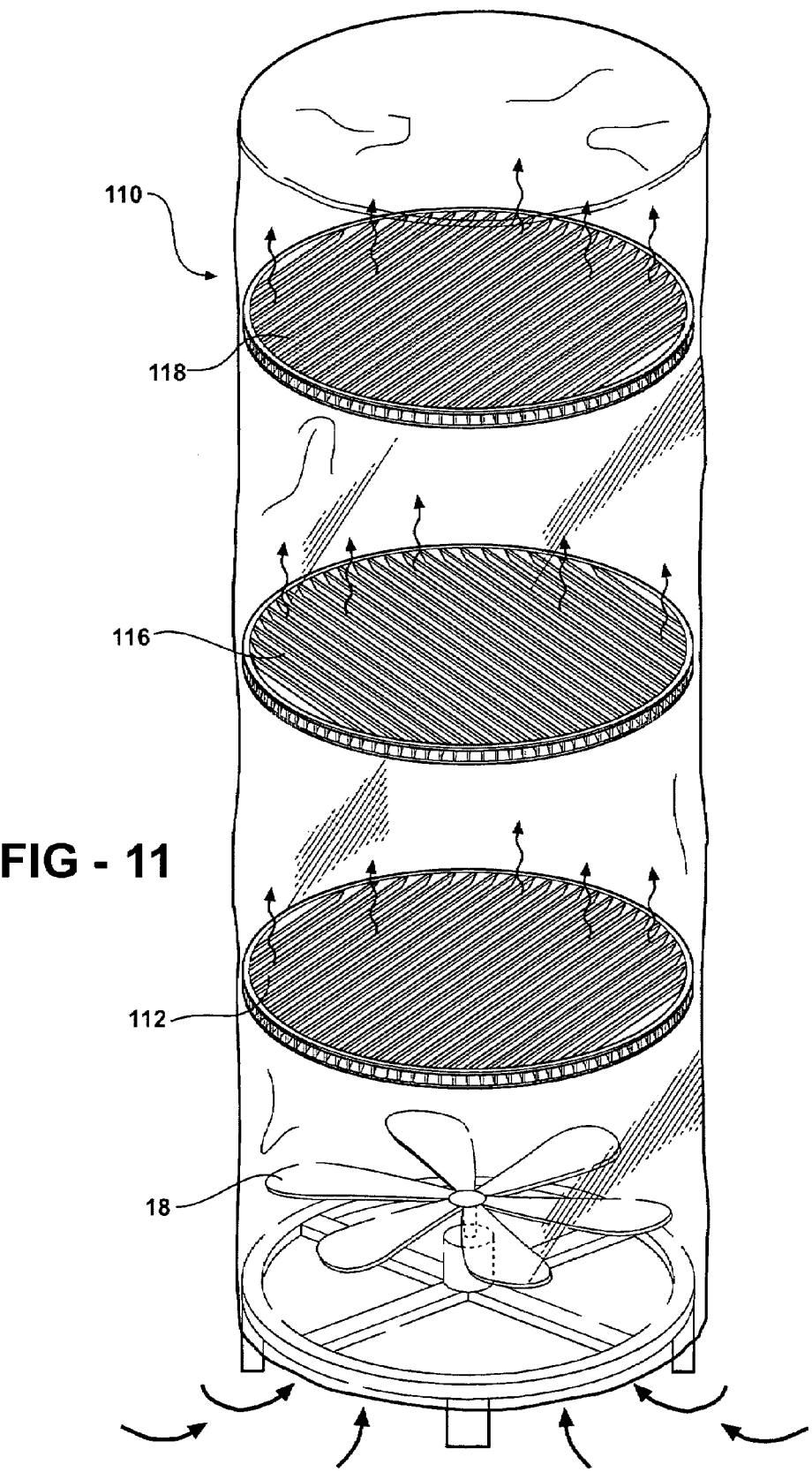
FIG. 11 is a perspective view of yet another embodiment of generator of the present invention having a plurality of absorbers disposed in series.

Referring now to FIG. 11, there is shown yet another embodiment of generator unit 110 structured in accord with the principles of the present invention. This embodiment basically comprises a generator of the type previously described, further including a series of auxiliary absorber assemblies. As depicted in FIG. 11, the generator unit 110 includes a first absorber assembly 112 as previously described. In this embodiment, a turbine 18 is disposed beneath this first absorber. The unit 110 is encased in a transparent enclosure 114 which is made from glass, a polymer, or the like. A second absorber assembly 116 is disposed in series with the first, and a third absorber assembly 118 is disposed in series with the second 116. In this embodiment, the combination of multiple absorbers and enclosures produces a very strong rising airflow. Embodiments of this type are most preferably configured as relatively small generating units having high output. It is to be understood that yet other absorbers may be incorporated into the system. Also, the turbine may be positioned at other locations in the stack and/or multiple turbines may be incorporated.

In view of the teaching presented herein, yet other embodiments of the invention will be apparent to one of skill in the art, and all of such embodiments are within the scope of the invention. It is the following claims, including all equivalents, which define the scope of the invention.

The invention claimed is:

1. A solar-thermal powered generator comprising:
    an absorber assembly for absorbing incident light, said absorber assembly including a gas permeable body of light absorbing material which is operative to absorb incident light and convert said absorbed light into heat energy, said gas permeable body of light absorbing material being supported in a spaced-apart relationship with a subjacent surface so as to define a volume which is bounded by said body of light absorbing material and said subjacent surface, and so that a gas may flow from said volume through said gas permeable body of light absorbing material;
    a gas flow channel which establishes fluid communication between said volume and an ambient atmosphere so that a gas stream can flow therebetween; and
    a turbine which is disposed so as to intercept said gas stream and extract kinetic energy therefrom; whereby when said body of light absorbing material absorbs light and converts said absorbed light to heat, said heat warms said ambient atmosphere proximate said body of light absorbing material so as to decrease the pressure thereof and cause said atmosphere to rise whereby said rising atmosphere causes gas to flow through said gas flow channel, into said volume and through said gas permeable body of light absorbing material.

2. The power generator of claim 1, wherein said body of light absorbing material is maintained in a spaced-apart relationship with said subjacent surface by a sidewall.

3. The power generator of claim 1, further including an electrical generator in mechanical communication with said turbine.

4. The power generator of claim 1, wherein said body of light absorbing material comprises a bed of mineral material.

5. The power generator of claim 1, wherein said body of light absorbing material comprises a louvered body.

6. The power generator of claim 2, wherein said gas flow channel extends through said sidewall.

7. A method for generating power from solar-thermal energy, said method comprising the steps of:
    providing a generator, said generator having an absorber assembly for absorbing incident light, which absorber assembly includes a gas permeable body of light absorbing material which is operative to absorb incident light and convert said absorbed light into heat energy, said gas permeable body of light absorbing material being supported in a spaced-apart relationship with a subjacent surface so as to define a volume which is bounded by said body of light absorbing material and said subjacent surface, and so that a gas may flow from said volume through said gas permeable body of light absorbing material; said generator further including a gas flow channel which establishes fluid communication between the volume and an ambient atmosphere so that a gas stream can flow therebetween; said generator further including a turbine which is disposed so as to intercept said gas stream and extract kinetic energy therefrom;
    disposing said generator so that said body of light absorbing material absorbs solar illumination and converts said illumination to heat; whereby said heat warms said ambient atmosphere proximate said body of light absorbing material so as to decrease the pressure thereof and cause said atmosphere to rise whereby said rising atmosphere causes gas to flow through said gas flow channel, into said volume, and through said gas permeable body of light absorbing material so as to impart mechanical energy to said turbine.

* * * * *